UNITED STATES PATENT OFFICE.

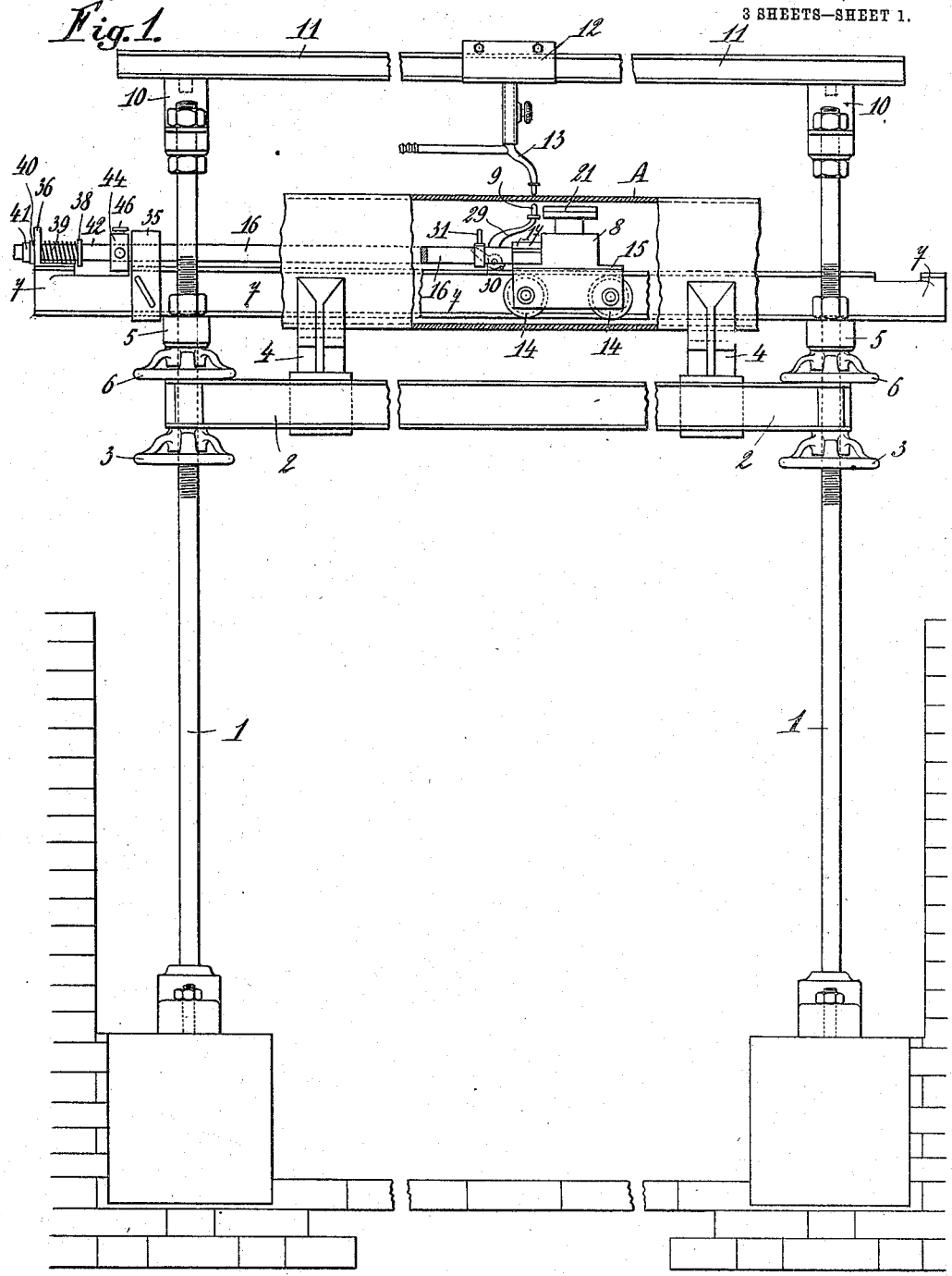

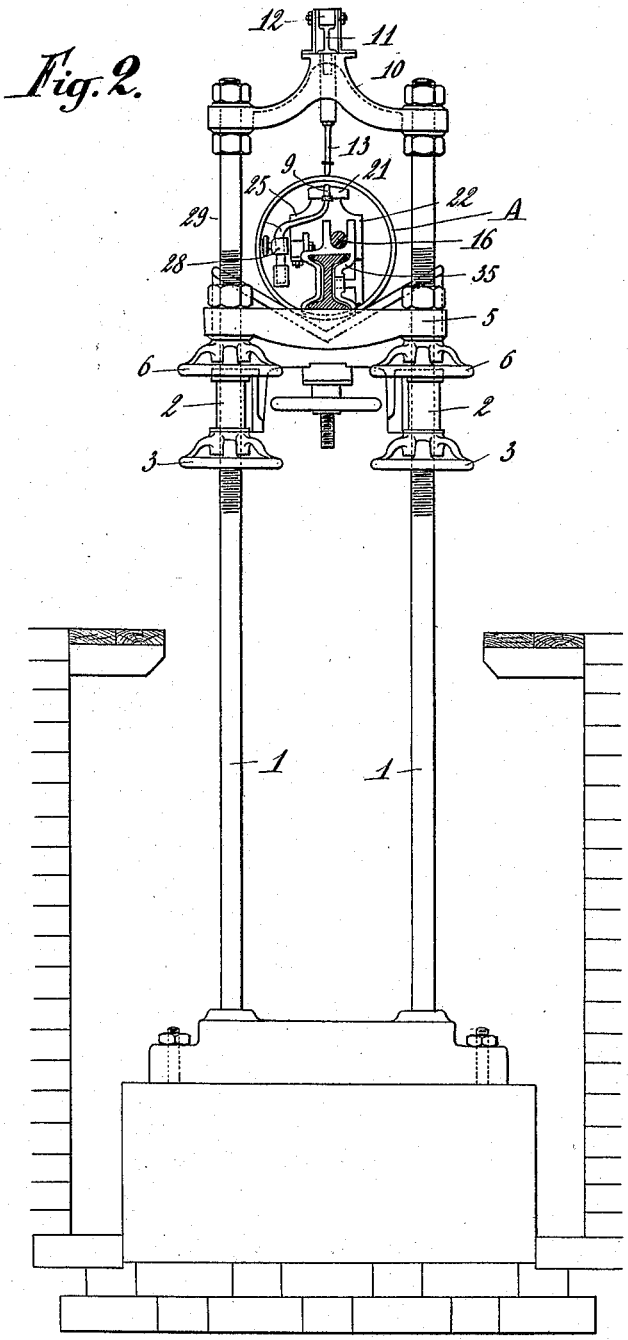

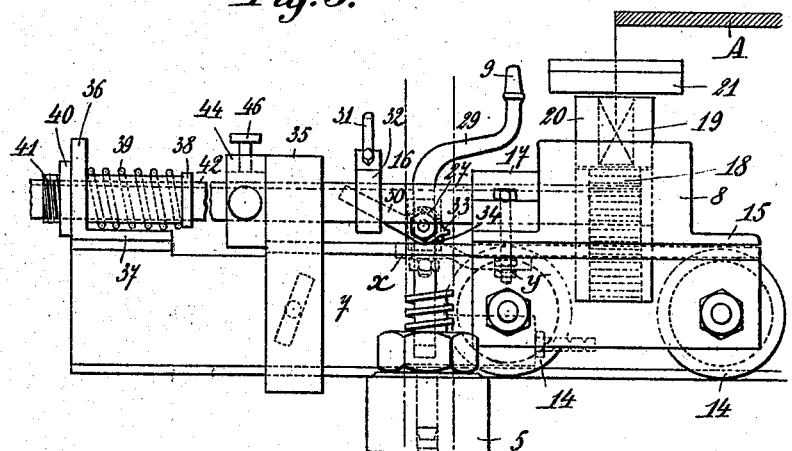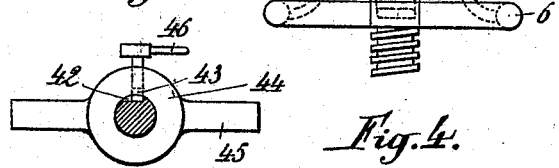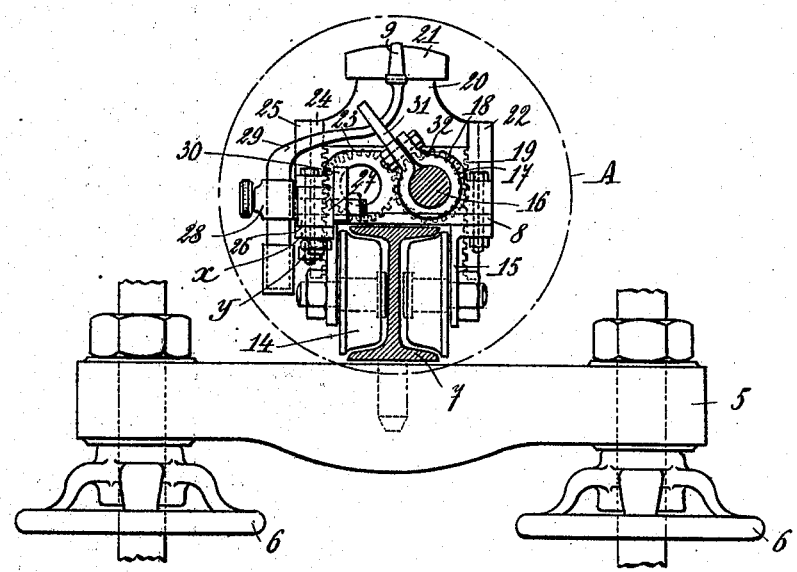

FÉLIX JOTTRAND, OF UCCLE, NEAR BRUSSELS, BELGIUM; JULIA RENARD JOTTRAND, WIDOW OF SAID FÉLIX JOTTRAND, DECEASED, FOR HERSELF AND AS GUARDIAN, AND AUGUSTE JOTTRAND, AS ASSOCIATE GUARDIAN OF THE HEIRS-AT-LAW, ASSIGNORS TO SOCIÉTÉ ANONYME L'OXHYDRIQUE INTERNATIONALE, A CORPORATION OF BELGIUM.

MACHINE FOR WELDING METAL TUBES, RINGS, AND THE LIKE.

No. 900,381.   Specification of Letters Patent.   Patented Oct. 6, 1908.

Application filed August 10, 1905.   Serial No. 273,518.

*To all whom it may concern:*

Be it known that I, FÉLIX JOTTRAND, engineer, a subject of Belgium, residing at Uccle, near Brussels, in the Kingdom of Belgium, have invented new and useful Improvements in Machines for Welding Metal Tubes, Rings, and the Like, of which the following is a specification.

This invention relates to a machine for welding metal tubes rings or other tubular pieces of work along a longitudinal generator.

The object of the invention is to provide a machine of simple and practical construction in which the heating of the work to be treated can be simultaneously effected from both the inside and outside and in which the welded part can be submitted to a hand hammering operation after the welding of a certain length, a block or equivalent being introduced at this time into the interior of the work to serve as a supporting surface or anvil during said hammering.

The invention consists more particularly in certain combinations and arrangements of parts, as will be hereinafter described in detail and specifically pointed out in the claims.

In the annexed drawing which shows a machine constructed according to the present invention Figure 1 is a complete side elevation of said machine and Fig. 2 is an end elevation thereof. Fig. 3 is a separate view on a larger scale of the slide or carriage carrying the blow pipe by which the work is heated interiorly and of the mechanism for regulating the forward and backward movements of said carriage. Fig. 4 is a cross section of Fig. 3, and Fig. 5 is a detail view of the carriage controlling lever.

Reference being made to Figs. 1 and 2 the machine comprises columns 1 screw threaded for part of their length and on which longitudinal beams 2 are adapted to be adjusted in any suitable position by means of hand wheels 3. The said beams carry brackets 4 of the shape shown in Fig. 2 and adapted to receive the work A to be treated. The said columns 1 are connected together by two cross bars 5, the position of which can be adjusted by means of the hand-wheels 6. The cross bars 5 serve as a support for a beam 7 on which travels a carriage 8 carrying a blow pipe nozzle 9 for heating the interior of the work. This blow pipe is fed with gas in any suitable way by flexible pipes not shown in the drawing.

The columns 1 are connected at their upper ends by cross heads 10 which support a beam 11 on which a carriage 12 is adapted to be displaced for instance by hand said carriage carrying a blow pipe 13 adapted to heat the exterior of the work A. The said blow-pipe 13 is also fed with gas through suitable flexible pipes (not shown). As shown more particularly in Figs. 3 and 4, the carriage 8 is carried by four slightly conical wheels 14 rotating between the flanges of the beam 7. The said wheels 14 are carried by gudgeons fixed to the plates 15 carrying the carriage proper which is displaced longitudinally on the beam 7 by means of a rod 16 adapted to rotate in the carriage in a suitable bearing 17. The said rod 16 terminates in the axis of the carriage in a gear wheel 18 adapted to directly actuate a toothed bar 19 integral with a support 20 carrying a hammering block or anvil 21. The toothed bar 19 slides in a groove in a bracket 22 integral with the carriage. The gear wheel 18 also meshes with a pinion 23 mounted on a shaft rotating in suitable bearings carried by the carriage. This pinion gears in turn with a toothed bar 24 also integral with the aforesaid support and arranged symmetrically with regard to the bar 19. The toothed bar 24 slides in a groove in a bracket 25 arranged symmetrically with regard to the bracket 22. By these means traction exerted on the rod 16 will move the carriage 8 longitudinally on the beam 7, and rotation of said rod 16 will raise or lower the block or anvil 21 by means of the pinion 18 directly operating the toothed bar 19 and indirectly the toothed bar 24 by means of the pinion 23.

To the carriage 8 is attached by means of a bolt *y* or otherwise a support or bracket *x* carrying an upwardly directed lug 26 (Figs. 3 and 4), on which is pivoted a block or trunnion 27 carrying a socket 28 for the tube 29 of the blow-pipe. This block, trunnion or gudgeon 27 also carries a lever 30 projecting laterally to the left therefrom in Fig. 3.

31 designates an abutment which can be fixed in adjustable relation on the rod 16 by means of the split ring 32 which can be secured in different angular relations. The abutment 31 is impelled downward against the lever 30 when the rod 16 is rotated to raise the anvil. The form of the pipe 29 is such as to maintain the blow-pipe in its normally operative position by gravity (see Fig. 3), there being a stop 34 in the path of a lug 35 on the trunnion or gudgeon 27, to determine such position.

The operating rod 16 passes through an adjustable support 35 mounted on the beam 7 at one end of the machine and also through a fixed bracket 36 having a horizontal angular extension or branch 37. The bracket 36, 37 carries a sleeve 38 surrounding the rod 16 and under the action of a spring 39. The position of this sleeve and the degree of compression of the spring 39 can be adjusted by means of a nut 40 engaging the screw threaded end 41 of the sleeve 38. The rod 16 is provided with a longitudinal groove 42 into which engages a key 43 located in a collar 44 forming part of a lever 45 (Fig. 5) for operating the rod 16. The key 43 can be engaged in or released from the groove 42 by about a quarter turn of a handle or lever 46.

The movement of the collar 44 between the support 35 and the end of the horizontal branch 37 of the bracket 36, 37 is normally equal to the distance which separates the axis of the nozzle 9 of the blow pipe 29 from the axis of the block 21, and the position of the sleeve 38 is adjusted according to the duration of the heating.

The action of the machine described is as follows: The work A is placed on the supports 4 with the seam to be treated directed upwards in the axial and longitudinal plane of the machine. The beam 7 must, of course, initially be passed through the pipe to be welded. This is done as follows: The pipe is first placed on the brackets 4, the beam 7 being removed from the machine altogether together with the carriage 8. The said beam is then introduced into the pipe through one extremity of the latter and placed on the cross bars 5, the height of which has previously been adjusted by means of the hand-wheels 6 so as to be above the lower edge of the pipe. The carriage 8 is then placed on the beam 7 and connected to the rod 16 outside the pipe. The position of the carriage 8 is then adjusted in such a manner that the blow pipe 9 is caused to heat the work from the interior and similarly the position of the upper blow pipe 13 is adjusted to heat the work at a point exactly opposite that heated by the blow pipe 9. When the work has been heated at one part for instance at the center of its length the attendant exerts traction on the lever 45 connected to the rod 16 by means of the lever 46 and key 43 and by this operation the carriage is moved in a longitudinal direction until the collar 44 of the lever 45 makes contact with the end 37 of the bracket 36, 37 which movement also forces back the sleeve 38 against the action of the spring 39. The attendant then partially rotates the rod 16 by means of the lever 45 which has the effect, on one hand, of lowering the abutment 31 on the lever 30, and causing the blow-pipe 29 to be removed from the block 21, and, on the other hand, of raising said block by means of the pinions 18 and 23 and toothed bars 19 and 24. The block being raised, the hammering can be effected by means of a hand operated hammer or in any other suitable manner to render the welded surface uniform. After the hammering operation the carriage must be returned to guide the blow pipe 9 back to the exact point to be heated, but before doing so the attendant manipulates the handle 46 to give same about a quarter turn which disengages the collar 44 from the rod 16. By this means the sleeve 38, under the action of the spring 39 forces back the collar 44 for the distance by which said sleeve 38 has been previously moved after which the attendant again causes the collar 44 to engage the rod 16 by a reverse movement of the handle 46, and then operates the lever 45 to rotate the rod 16 in the reverse direction and thus release the blow pipe 29, which again resumes its original position, whereupon the block 21 is lowered. The lever 45 is then forced back until the collar 44 again contacts with the bracket 35, by which movement the carriage is returned but since the rearward movement of the lever 45 and collar 44 is less than the forward movement previously effected, the blow pipe assumes the desired position under another portion of the tube. For this purpose it is sufficient that the position of the sleeve 38 with regard to the abutment formed by the bracket 36, 37 should be suitably adjusted according to the duration of the heating. It will be easily understood that under these conditions, the forward movement of the carriage is equal, at each operation to the travel of the collar 44 between the bracket 35 and abutment 37, whereas the rearward movement is equal to the travel of said collar 44 between the end of the sleeve 38 and the bracket 35, when the spring 39 projects said sleeve 38 for a certain distance relatively to said abutment 37 or to the nut 40 on the branch 36.

It will be evident from the above description that in the present machine the block 21 will only be slightly affected by the action of the blow pipe the latter being removed from said block during the whole of the hammering operations.

What I claim as my invention and desire to secure by Letters Patent of the United States is:—

1. In a machine of the class described, an anvil, a support for said anvil, means for elevating said anvil from its support, and a heater also carried by the same support.

2. In a machine of the class described, an anvil, a support therefor, means for elevating said anvil from its support, a heater also carried by said support, and means for displacing said heater through the movement of the anvil.

3. In a machine of the class described, an anvil, a support therefor, means for elevating said anvil, a heater pivoted to said support, and means for swinging said heater laterally away from said anvil through the movement of the latter.

4. In a machine of the class described, an anvil, a support therefor, a heater also carried by said support, and a single means for elevating said anvil and displacing said heater with respect to said support.

5. In a machine of the class described, an anvil, a longitudinally movable carriage supporting the same, a heater also supported on said carriage, and means for displacing said heater laterally with respect to said anvil.

6. In a machine of the class described, an anvil, a carriage supporting the same, means for elevating said anvil on said carriage, and a heater also supported by said carriage.

7. In a machine of the class described, an anvil, a carriage supporting the same, means for elevating said anvil on said carriage, a heater also supported by said carriage, and means for displacing said heater laterally with respect to said anvil.

8. In a machine of the class described, an anvil, a carriage supporting the same, a heater also supported by said carriage, and a single means connected to elevate said anvil and displace said heater simultaneously.

9. In a machine of the class described, a beam adapted to be positioned within a pipe, a carriage guided by said beam, an anvil on said carriage, a rod extending from said carriage in the longitudinal direction of said beam, means operated by the angular movement of said rod for elevating said anvil, and a heater supported by said carriage.

10. In a machine of the class described, a beam adapted to be positioned within a pipe, a carriage guided by said beam, an anvil on said carriage, a rod extending from said carriage in the longitudinal direction of said beam, means actuated by an angular movement of said rod for elevating said anvil, a heater supported by said carriage, and means for displacing said heater through the movement of said anvil.

11. In a machine of the class described, a beam adapted to be positioned within a pipe, a carriage guided by said beam, an anvil on said carriage, a rod extending from said carriage in the longitudinal direction of said beam, means actuated by an angular movement of said rod for elevating said anvil, a heater supported by said carriage, a lever fixed to said heater, and means connected to said rod and displaced by the movement thereof for engaging said lever to displace the heater.

12. In a machine of the class described, a carriage, an anvil having dependent racks, a pair of gears meshing with one another and with said racks, and a rod extending from one of said gears away from said carriage, as and for the purpose set forth.

13. In a machine of the class described, a carriage, an anvil thereon, a rod extending away from said carriage by which the latter is moved longitudinally, and means operated by the angular movement of said rod for elevating said anvil.

14. In a machine of the class described, a carriage, an anvil supported thereby, a rod attached to said carriage by which said carriage is longitudinally moved, means connected to said rod for elevating said anvil when the rod is turned, a heater supported by said carriage, and means for displacing the heater through the elevation of the anvil.

15. The combination with means for supporting a tubular piece of work to be welded, of a bar adapted to be inserted into said work, a carriage adapted to be displaced on said bar, a heater supported by said carriage and adapted to internally heat the work, a block supported by said carriage.

In testimony whereof I have signed my name to this specification in the presence of two subscribing witnesses.

FÉLIX JOTTRAND.

Witnesses:
 MAURICE GERBEAULT,
 GREGORY PHELAN.